(12) United States Patent
Schreiber

(10) Patent No.: US 9,244,151 B2
(45) Date of Patent: Jan. 26, 2016

(54) METHOD FOR DETERMINING A POSITION OF A MOBILE TERMINAL

(71) Applicant: SIEMENS CONVERGENCE CREATORS GMBH, Vienna (AT)

(72) Inventor: Gerald Schreiber, Wentorf (DE)

(73) Assignee: SIEMENS CONVERGENCE CREATORS GMBH (AT)

( * ) Notice: Subject to any disclaimer, the term of this patent is extended or adjusted under 35 U.S.C. 154(b) by 0 days.

(21) Appl. No.: 14/338,474

(22) Filed: Jul. 23, 2014

(65) Prior Publication Data

US 2015/0057925 A1    Feb. 26, 2015

(30) Foreign Application Priority Data

Aug. 20, 2013    (EP) .................................... 13180949

(51) Int. Cl.
| | |
|---|---|
| *G01S 19/00* | (2010.01) |
| *G01S 5/02* | (2010.01) |
| *G01S 19/25* | (2010.01) |

(52) U.S. Cl.
CPC ............. *G01S 5/0252* (2013.01); *G01S 19/258* (2013.01)

(58) Field of Classification Search
CPC ....... G01S 19/258; G01S 19/13; G01S 19/42; G01S 19/14
See application file for complete search history.

(56) References Cited

U.S. PATENT DOCUMENTS

| 5,243,652 | A | 9/1993 | Teare | |
|---|---|---|---|---|
| 6,810,527 | B1 | 10/2004 | Conrad | |
| 7,343,157 | B1 | 3/2008 | Mitchell | |
| 2007/0042765 | A1* | 2/2007 | Bailin et al. | 455/419 |
| 2008/0020702 | A1* | 1/2008 | Jendbro et al. | 455/3.01 |
| 2009/0094257 | A1* | 4/2009 | Nissen | 707/10 |
| 2011/0273327 | A1* | 11/2011 | Weng et al. | 342/357.25 |

FOREIGN PATENT DOCUMENTS

| WO | WO 9635293 A1 | 11/1996 |
|---|---|---|
| WO | WO 02071756 A1 | 9/2002 |
| WO | WO 03024085 A2 | 3/2003 |

\* cited by examiner

*Primary Examiner* — Michael J Zanelli
(74) *Attorney, Agent, or Firm* — Schmeiser Olsen & Watts LLP

(57) ABSTRACT

A method for determining a position of a mobile terminal while using an aircraft is provided. Before using the aircraft, orbital data for the navigation satellites of the navigation satellite system is loaded onto the mobile terminal. A planned flight route can then be identified by the mobile terminal with reference to a boarding pass. While using the aircraft, an application on the mobile terminal correlates a current time, the flight route of the aircraft, and the positions of the navigation satellites as ascertained with reference to the orbital data of the navigation satellites to determine which navigation satellites can be received at the current time, and these are then compared with navigation satellite signals that are actually received by the mobile terminal to derive a position of the mobile terminal and to establish whether the mobile terminal is actually located in the aircraft.

11 Claims, 1 Drawing Sheet

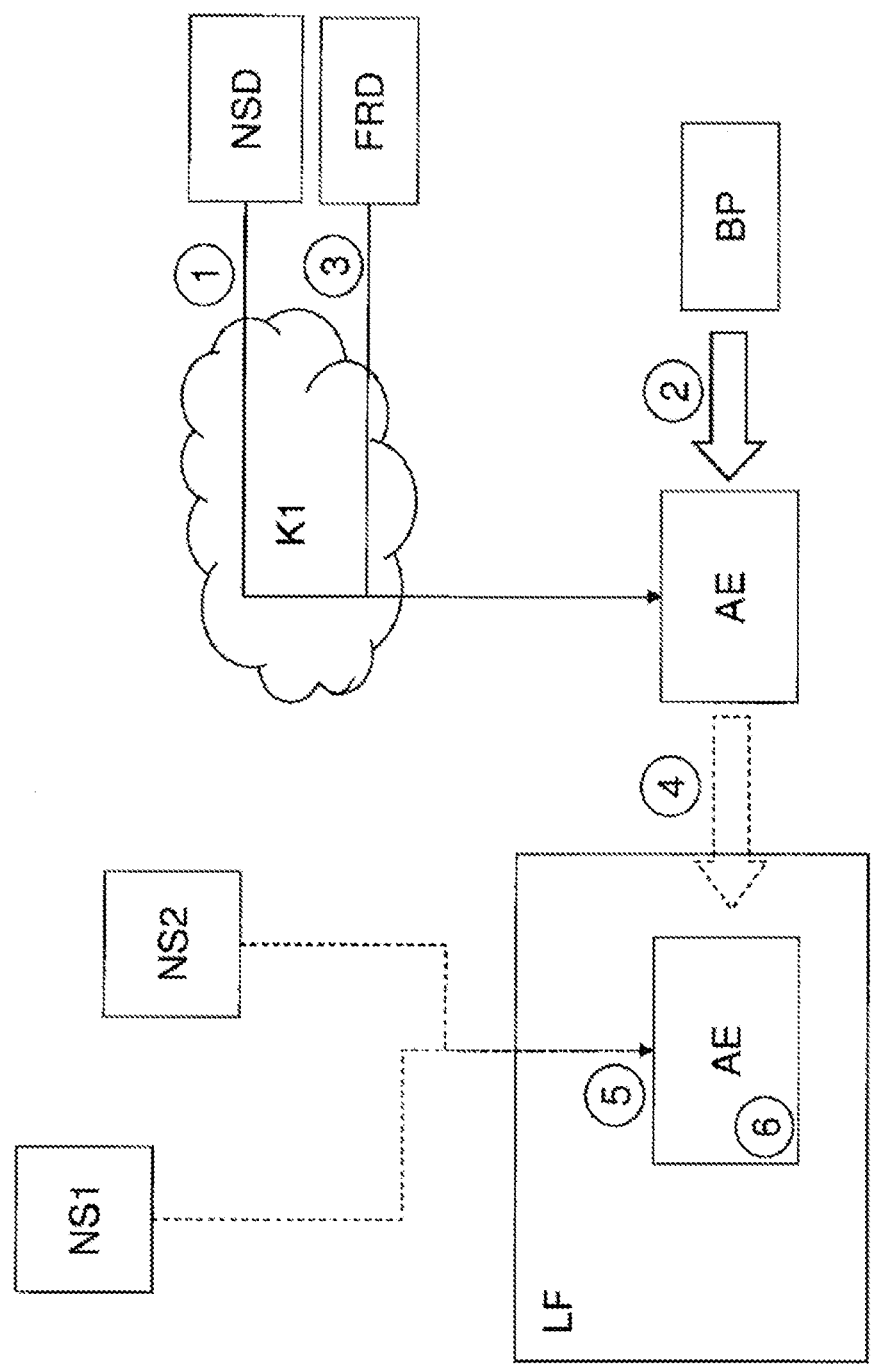

METHOD FOR DETERMINING A POSITION OF A MOBILE TERMINAL

CROSS-REFERENCE TO RELATED APPLICATIONS

This application claims priority to EP Application No. 13180949.3, having a filing date of Aug. 20, 2013, the entire contents of which are hereby incorporated by reference.

FIELD OF TECHNOLOGY

The following relates to a method for determining a position of a mobile terminal while using an aircraft, in particular an airplane. In this case, transmission facilities of the mobile terminal for setting up and maintaining a connection to a radio network are deactivated in the aircraft. However, the mobile terminal is equipped to receive and analyze navigation satellite signals of a navigation satellite system.

BACKGROUND

So called infotainment (i.e. movies, music, news information, etc.) is offered for the entertainment of passengers in aircraft, in particular passenger airplanes. This multimedia infotainment content may be available to passengers during a flight, for example, on mobile terminals such as tablet PCs or smartphones, for example. The proprietors of rights in the infotainment content normally only grant usage rights to the content (e.g. movies, music items, etc.) for a clearly limited scope of use. For example, said scope of use may have temporal (e.g. a time window), spatial (e.g. region, language, etc.) and/or situational (e.g. for cinema, home TV, mobile use, use by an airline, etc.) limitations. Provision is therefore made for special usage rights such as e.g. the so-called "Airline Hospitality Window" in relation to infotainment content that is to be used in an aircraft, such usage rights being required in order to use this relatively new infotainment content while using an aircraft or a flight.

Various means of using infotainment content in aircraft, in particular passenger airplanes, are known. One possibility is for mobile terminals containing previously downloaded infotainment content to be given to passengers on loan during a flight by the respective airline operator, or for passengers in the aircraft to be able to download infotainment content onto their own mobile terminals by means of so-called streaming from a streaming server which is installed in the aircraft. However, these two variants require a corresponding infrastructure and logistics on the part of the airline operator. A corresponding efficient and expensive infrastructure (e.g. server, mobile terminals, etc.) must be available in the airplane, and this infrastructure must be updated continuously for current infotainment content, wherein a large number of mobile terminals must be provided with new content or a large volume of data must be transferred onto the streaming server, for example.

The infotainment content can also be downloaded by the respective passenger onto their own mobile terminal already before using an airplane. For this purpose, infotainment content can be purchased in advance by a passenger and stored on their mobile terminal, wherein little or no content from the so-called "Airline Hospitality Window" is used for this purpose, and use is instead made of content that is e.g. accessible generally and e.g. available via the Internet or specific Internet sites. A further possibility is however provided by so-called buffered infotainment content. In this case, infotainment content is downloaded by the passenger e.g. from an airline-operated server onto their mobile terminal while on the ground and before using the aircraft, for example. The content can then be viewed with a time delay in the airplane. However, this variant of the infotainment content use only allows partial verification of the so-called "Airline Hospitality Window", i.e. use in the airplane. While it is possible to check a temporal restriction relating to the use of the content, it is not possible to monitor regional or situational use of the content as part of limiting the usage rights to view the infotainment content during a flight, since it is not possible to establish whether the mobile terminal is actually in the aircraft. Therefore e.g. usage rights relating to use of content on the ground are applied in many cases, and consequently the available content is frequently out of date and/or subject to a regional usage restriction.

Although mobile terminals such as e.g. tablet PCs, smartphones, etc. now offer facilities and/or applications for position fixing, use thereof may be restricted or ineffective in an aircraft. The connection to the radio network is often used as a basis for fixing the position of a mobile terminal such as a cell phone, for example. However, this connection is deactivated for reasons of safety in an aircraft. In order to effect this deactivation, modern mobile terminals such as e.g. tablet PCs and smartphones can be switched into so-called flight mode, in which the connection and connection setup to a radio network is prevented.

However, these modern mobile terminals, which can also be used to play infotainment content, often have e.g. a facility and/or application by means of which satellite signals of a global navigation satellite system can be received and analyzed for the purpose of position fixing. In the case of satellite-based position fixing e.g. by means of GPS (Global Positioning System), three-dimensional position fixing of the mobile terminal nonetheless requires a distance from the mobile terminal to at least four visible navigation satellites to be ascertained. The distance between the relevant navigation satellites and the mobile terminal is then derived from a signal propagation time. Due to the screening effect of the airplane shell, reception of navigation satellite signals is however usually insufficient to allow position fixing of the mobile terminal in an aircraft.

In addition, mobile terminals such as e.g. tablet PCs, smartphones, etc. often lack full receivers for navigation satellite signals or GPS, and instead use a method called Assisted GPS. In this case, the mobile terminal simply takes propagation time measurements based on the receipt of so-called pseudoranges to a plurality of navigation satellites. The name pseudoranges is used because, due to a limited length of the sequences of the navigation satellite signals, the propagation time between the navigation satellites and the mobile terminal is only a modulo 1 ms value. For the purpose of position fixing, the navigation satellite signals must be supplemented by further information (so-called auxiliary data such as e.g. navigation data or orbital data of the satellites), which is supplied via the respective radio network or radio communication system in the case of Assisted GPS. However, this information is not available in an airplane because a connection to the radio network is not present or has been deactivated. Moreover, the navigation signals of the satellites in the airplane are severely attenuated or, for example, a sufficient number of navigation satellite signals for position fixing can seldom be received. At best, they may be available from a seat in the immediate vicinity of an airplane window.

For the purpose of validation for a subsequent journey by air, position fixing can be performed at a departure airport and then used. However, this procedure has the disadvantage that the position fixing is relatively unreliable and inaccurate for checking corresponding usage rights in relation to infotainment content which is only allowed to be used during a flight, for example. Although it can be established that a passenger is located at the departure airport with the relevant mobile terminal on which this specifically protected content will be used, it is not conclusively checked whether the corresponding flight is also used.

Further possibilities for determining a position of a mobile terminal in an aircraft, or checking whether a specific mobile terminal is located in a specific aircraft, consist in e.g. the aircraft providing amplification facilities (so-called repeaters) for navigation satellite signals or broadcasting current position data in the airplane via wireless LAN or Bluetooth, for example. In both cases, a dedicated and generally expensive infrastructure must be installed in the airplane in order that the position data can be supplied. In particular, specific cost-intensive precautions must be taken when using repeaters for the navigation satellite signals, since navigation satellite signals are very important to flight safety and therefore disruptions must be prevented.

SUMMARY

An aspect relates to a method for determining a current position of a mobile terminal when using an airplane, by means of which it is easily and reliably possible to fix the position of the mobile terminal with sufficient accuracy and at no additional cost, and by means of which it is very easy to establish whether a mobile terminal is on board an airplane.

Embodiments may include a method of the type cited in the introduction, wherein orbital data of navigation satellites of a global navigation satellite system can be loaded onto the mobile terminal before using the aircraft. While using the aircraft, an application installed on the mobile terminal can be used to correlate a current time, a current flight route of the aircraft, and positions of the navigation satellites as ascertained with reference to orbital data of the navigation satellites. A position of the mobile terminal may then be derived from a result of this correlation, and it is established with relatively good probability whether the mobile terminal is located in the aircraft.

Embodiments of the method may be able to approximately fix a position of a mobile terminal in an aircraft during a flight by means of a facility which is installed in said terminal for the purpose of receiving navigation satellite signals, wherein this can be achieved in a simple manner and without e.g. laborious and cost-intensive installation of a corresponding infrastructure. In this way, it can be very easy to determine whether or not the mobile terminal is located on board an airplane. By utilizing a correlation of the flight route, the time and a visibility of navigation satellites or ability to receive the navigation satellite signals they transmit, it can be very easy to determine the probability that the mobile terminal is present in the aircraft concerned. Those navigation satellites which are receivable (i.e. visible) at the assumed position on the flight route can be ascertained with reference to the orbital data of the navigation satellites. This may provide the basis for a negative correlation, i.e. a comparison with the navigation satellite signals actually received by the mobile terminal establishes whether all or at least most of the receivable or visible navigation satellites at the assumed position on the flight route are also actually received. This result can then be applied for the purpose of e.g. accessing new and current infotainment content whose use is restricted by corresponding usage rights ("Airline Hospitality Window").

Furthermore, for the purpose of correlation with the flight route and the time, from which an assumed position of the aircraft is derived, the application on the mobile terminal may additionally or alternatively refer only to the navigation satellite signals received by the mobile terminal while using the aircraft. By this simple means, it may be possible to perform a positive correlation and to determine the probability that the navigation satellite signals which are actually received correspond to the assumed position on the flight route. The result of this correlation can then likewise be used to allow access to new and current infotainment content whose use is restricted by corresponding usage rights ("Airline Hospitality Window").

A proof of use for the aircraft, in particular a boarding pass, may be used to identify the current flight route in this case. Such proof of use (e.g. a boarding pass) may feature a barcode which can be scanned and analyzed by the mobile terminal before or even during the flight, for example. The current flight route of the aircraft concerned can then be identified very easily from the data, e.g. flight number and date of proof of use. In this way, the flight route can be loaded onto the mobile terminal before the flight, for example, with reference to the date and flight number. For example, a service such as FlightRadar24 can be used for this purpose.

Alternatively, for the purpose of identifying the current flight route, it may also be beneficial to load at least e.g. a regional selection of flight routes or possibly all available flight routes onto the mobile terminal before using the aircraft. In this case, the proof of use or boarding pass can then be read and analyzed by means of the mobile terminal during the flight. On the basis of the flight number and the date from the proof of use or boarding pass, for example, the current flight route is then ascertained from the flight routes previously loaded onto the mobile terminal and used for the correlation.

In an exemplary embodiment of the method, provision is made for modeling an attenuation characteristic of a respective aircraft type. This attenuation characteristic may then be correlated with the navigation satellites which have been identified as receivable. The receivable or visible satellites, or the current positions of said navigation satellites, can be better ascertained with the aid of this modeled attenuation characteristic. For example, it can be assumed that navigation satellites slightly above the horizon to the right or left of the flight direction are more visible or their navigation satellite signals are easier to receive than satellites which are in a forward or rearward direction or in the zenith. The correlation with the attenuation characteristic makes it possible e.g. more easily and more quickly to establish an approximate position of the mobile terminal.

Furthermore, using the navigation satellite signals received by the mobile terminal, it may allow for a Doppler shift of the navigation satellite signals received by the mobile terminal to be taken into consideration and correlated with a speed and direction of the aircraft. In this way, it can be very easy to allow for movement and the direction of movement when the position fixing takes place. Any errors caused by the movement or speed of the airplane, e.g. in the navigation satellite signals received by the mobile terminal or in the current positions of the navigation satellites, may therefore be taken into consideration.

According to a further exemplary embodiment, a result of the comparison between the receivable navigation satellites and the navigation satellite signals actually received by the mobile terminal, or a result of the correlation of the flight route and the current time with the actually received navigation satellite signals, may be applied for the purpose of authorizing the use of multimedia content on the mobile terminal. By virtue of the position fixing of the mobile terminal, it can establish whether the mobile terminal is located in the airplane. A location (e.g. in the airplane) for the viewing of infotainment content can therefore easily be ensured. Consequently, it can ensure that infotainment content provided for e.g. a so-called "Airline Hospitality Window" is only viewed, played back, etc. on the mobile terminal in accordance with these usage rights. This provides a simple means of respecting the usage rights relating to new infotainment content.

In some exemplary embodiment, the so-called Global Positioning System or GPS as a navigation satellite system may be used. GPS is a global navigation satellite system which is used for position measurement and time measurement. GPS has the advantage that GPS devices or devices which are equipped to receive GPS signals only receive signals. In this case, GPS is based on satellites which continuously emit their current position and the precise time by means of coded radio signals. The respective GPS receiver can determine its own position and possibly speed from the signal propagation time. Having a navigation satellite network which can be used worldwide, GPS has established itself as an important positioning method worldwide, and is widely used.

Mobile terminals may take the form of so-called tablet PCs or so-called smartphones. An application for correlating time, flight route and position data from navigation satellites can be installed on these mobile terminals. Furthermore, these mobile terminals are often used to play back multimedia content and also feature an option for deactivating the connection to a radio network (so-called flight mode) without the mobile terminal having to be switched off, and are now often equipped to receive navigation satellite signals, in particular by means of GPS and/or Assisted GPS.

BRIEF DESCRIPTION

Some of the embodiments will be described in detail, with reference to the following figures, wherein like designations denote like members, wherein:

FIG. 1 schematically shows an exemplary execution of the method for determining a position of a mobile terminal while using an aircraft, in particular an airplane.

DETAILED DESCRIPTION

FIG. 1 schematically shows an exemplary execution of the method for fixing the position of a mobile terminal AE such as e.g. a tablet PC, smartphone, etc. during a flight in an aircraft LF, in particular an airplane. In this case, the mobile terminal AE is equipped to receive navigation satellite signals of a navigation satellite system such as e.g. GPS, etc. This means that the mobile terminal AE has e.g. a GPS receiver for this purpose or is equipped for so-called Assisted GPS. This functionality can be provided by e.g. smartphones, tablet PCs, etc. These mobile terminals AE are also suitable for playing infotainment content or multimedia content such as e.g. video and/or audio files, video streams, etc.

In the context of embodiments of the method, before using the aircraft LF, on the ground or before starting the flight, provision is made in a first method step 1 for loading orbital data NSD from navigation satellites NS1, NS2 onto the mobile terminal AE via a communication network K1 such as e.g. the Internet, assuming connectivity is available. At this time point, the mobile terminal AE does may not yet have to be switched into the so-called flight mode, i.e. the transmission facilities of the mobile terminal AE are not yet deactivated.

In a second method step 2, provision may be further made for analyzing a proof of use BP, e.g. shortly before starting a flight, in order to ascertain a planned flight route. For this purpose, e.g. a barcode on a boarding pass BP can be scanned and then analyzed by the mobile terminal AE in order to ascertain a flight number and a date. Using this data, it is then possible in a third method step 3 to load a flight route FRD of the planned flight onto the mobile terminal AE via the communication network K1. This functionality is provided via services such as FlightRadar24, for example.

Alternatively, analysis of the proof of use or boarding pass BP by the mobile terminal AE may also first occur during the flight, i.e. on board the aircraft LF. This means that the second method step 2 can first be performed on board the aircraft LF. Since the mobile terminal AE may be switched into the so-called flight mode or the transmission facilities of the mobile terminal AE may be deactivated on board the aircraft or during the flight, and therefore a connection may no longer exist to the communication network K1, the third method step 3 can be brought forward and either all available flight route data FRD or a regional selection of flight route data FRD may be loaded onto the mobile terminal in the third method step 3. Services such as e.g. FlightRadar24 can also be used for this purpose.

In a fourth method step 4, the passenger starts the planned flight and the mobile terminal AE may therefore be taken on board the aircraft LF. When using the aircraft LF or during the flight, the transmission facilities of the mobile terminal AE can be be deactivated or the mobile terminal AE can be switched into the so-called flight mode.

If the proof of use or the boarding pass BP was not already analyzed on the ground in order to ascertain the flight route FRD, and the current flight route FRD has therefore not been identified, the second method step 2 can now be completed. This means that e.g. the barcode of the boarding pass BP is then scanned and analyzed. On the basis of the flight number that has been identified and the date, it is then possible to ascertain the current flight route FRD from the flight routes FRD which were loaded onto the mobile terminal AE on the ground in the third method step 3. Once the current flight route FRD is known, it is possible in a fifth method step 5 by means of an application on the mobile terminal AE to correlate the current flight route FRD, a current time and positions of the navigation satellites NS1, NS2, these being derived from the orbital data NSD of said navigation satellites NS1, NS2. The result of this correlation then identifies those navigation satellites NS1, NS2 which can be received at the current time and at a position on the flight route FRD, said position being assumed on the basis of the flight route FRD and the current time. In FIG. 1, for example, two satellites NS1, NS2 are shown as receivable or visible for the mobile terminal AE located in the aircraft LF. However, more navigation satellites NS1, NS2 may also be identified as receivable.

In the sixth method step 6, those navigation satellites NS1, NS2 identified as receivable may be compared with the navigation satellite signals actually received by the mobile terminal AE in the aircraft LF. Since these signals normally contain an identification of the respective satellites NS1, NS2 and a current position of the respective satellites NS1, NS2, this comparison can be performed on the mobile terminal AE. The probability of whether or not the mobile terminal AE is located in the aircraft LF can then be derived from the comparison. This could be used to produce a negative correlation, for example, and check whether all or at least most of those navigation satellites NS1, NS2 which have been identified as receivable at the assumed position of the aircraft LF on the flight route FRD are received by the mobile terminal AE.

Alternatively or additionally, a correlation of the navigation satellite signals actually received by the mobile terminal AE can also be used by the application on the mobile terminal AE in the fifth method step 5 for correlation with the current time and the flight route FRD of the aircraft LF. The use solely of the navigation data of the navigation satellites NS1, NS2 currently received by the mobile terminal AE may allow e.g. a positive correlation, which can be analyzed in the sixth method step 6. As part of this analysis, it can then be checked whether or not the received navigation satellite data corresponds to the assumed position of the aircraft LF on the flight route FRD. It can then be derived from this, likewise with good probability, whether or not the mobile terminal AE is located in the aircraft LF.

In order to improve the respective correlation results, either on the basis of the navigation satellite data currently received by the mobile terminal AE or the comparison between receivable navigation satellites NS1, NS2 and the navigation satellite data received by the mobile terminal AE, an attenuation characteristic of the relevant aircraft type can be modeled, e.g. in the fifth method step 5, and this attenuation characteristic correlated with the receivable navigation satellites NS1, NS2, thereby making it possible to ascertain the receivable or visible satellites NS1, NS2 more effectively and easily.

Furthermore, a Doppler shift in the navigation satellite signal can be taken into consideration in the fifth and/or sixth method step 5, 6 and correlated with a known speed and direction of the aircraft LF.

In the sixth method step 6, the result of the comparison between the receivable navigation satellites NS1, NS2 and the navigation satellite signals received by the mobile terminal AE can then also be applied for the purpose of authorizing the use of multimedia content (so-called infotainment content). Alternatively or additionally if applicable, the result of the correlation of the flight route FRD, the current time and the navigation satellite signals actually received by the mobile terminal AE can also be used to ascertain an authorization for the use of multimedia content. This ensures that usage rights which are restricted to use in the aircraft LF, for example, are respected. Using the method according to the exemplary embodiments described herein, it is possible to determine with a high degree of probability whether the mobile terminal AE is actually located in the aircraft LF and therefore authorized to use the multimedia content.

The invention claimed is:

1. A method for determining a position of a mobile terminal while using an aircraft to determine whether the mobile terminal is located on the aircraft, wherein transmission facilities of the mobile terminal are deactivated in the aircraft, and wherein the mobile terminal is equipped to receive navigation satellite signals of a navigation satellite system, comprising:

loading orbital data for navigation satellites of the navigation satellite system onto the mobile terminal before using the aircraft;

correlating, by using an application on the mobile terminal and while using the aircraft, a current time, a flight route of the aircraft, and the positions of the navigation satellites as determined with reference to the orbital data of the navigation satellites, wherein the navigation satellites are receivable at the current time are determined therefrom; and comparing the receivable navigation satellites with navigation satellite signals actually received by the mobile terminal.

2. The method as claimed in claim 1, wherein that while using the aircraft, the navigation satellite signals actually received by the mobile terminal are used by the application on the mobile terminal for the purpose of correlation with the current time and the flight route of the aircraft.

3. The method as claimed in claim 1, wherein a proof of use for the aircraft is read and analyzed by the mobile terminal for the purpose of identifying the flight route.

4. The method as claimed in claim 3, wherein the proof of use is a boarding pass.

5. The method as claimed in claim 1, wherein that before using the aircraft, at least one flight route or a selection of flight routes is loaded onto the mobile terminal for the purpose of identifying the flight route.

6. The method as claimed in claim 1, wherein an attenuation characteristic of a respective aircraft type is modeled and the attenuation characteristic is then correlated with the navigation satellites identified as receivable.

7. The method as claimed in claim 1, wherein using the navigation satellite signals received by the mobile terminal, a Doppler shift of the navigation satellite signals received by the mobile terminal is taken into consideration and correlated with a speed and direction of the aircraft.

8. The method as claimed in claim 1, wherein a result of the comparison between the receivable navigation satellites and the navigation satellite signals received by the mobile terminal, or a result of the correlation of the flight route and the current time with the navigation satellite signals actually received, is applied for the purpose of authorizing a use of multimedia content on the mobile terminal.

9. The method as claimed in claim 1, wherein Global Positioning System (GPS) is used as a navigation satellite system.

10. The method as claimed in claim 1, wherein a tablet PC or a smartphone is used as the mobile terminal.

11. The method as claimed in claim 1, wherein the aircraft is a passenger airplane.

* * * * *